US012333960B2

(12) United States Patent
Ito et al.

(10) Patent No.: US 12,333,960 B2
(45) Date of Patent: Jun. 17, 2025

(54) VIRTUAL-ACCIDENT-IMAGE GENERATION DEVICE, VIRTUAL-ACCIDENT-IMAGE GENERATION METHOD, AND RECORDING MEDIUM

(71) Applicant: Panasonic Automotive Systems Co., Ltd., Kanagawa (JP)

(72) Inventors: Yoshiki Ito, Osaka (JP); Mitsuteru Kataoka, Osaka (JP); Yasushi Kojima, Osaka (JP); Masakiyo Nishikawa, Nara (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/612,488

(22) Filed: Mar. 21, 2024

(65) Prior Publication Data

US 2024/0331557 A1    Oct. 3, 2024

(30) Foreign Application Priority Data

Mar. 30, 2023  (JP) .................. 2023-054470

(51) Int. Cl.
*G09B 5/02*    (2006.01)
(52) U.S. Cl.
CPC ..................... *G09B 5/02* (2013.01)
(58) Field of Classification Search
CPC ........................................ G09B 5/02
See application file for complete search history.

(56) References Cited

FOREIGN PATENT DOCUMENTS

| JP | 2015-219736 | 12/2015 |
| JP | 2019-163969 | 9/2019 |

OTHER PUBLICATIONS

Office Action from Japan Patent Office (JPO) in Japanese Patent Appl. No. 2023-054470, dated Mar. 11, 2025, together with an English language translation.

*Primary Examiner* — Kesha Frisby
(74) *Attorney, Agent, or Firm* — Greenblum & Bernstein, P.L.C.

(57) ABSTRACT

A virtual-accident-image generation device includes: a dangerous driving determiner capable of determining, based on vehicle information regarding a vehicle driven by a driver, that driving of the driver corresponds to dangerous driving; a virtual-accident-object generator that generates, based on the vehicle information and a determination result that was determined by the dangerous driving determiner and indicates that the driving of the driver corresponds to the dangerous driving, a virtual accident object that would potentially get into an accident with the vehicle if the virtual accident object were actually present, in an image of a scene where the driver is driving the vehicle; and a virtual-accident-image generator that generates, based on the virtual accident object generated by the virtual-accident-object generator, a virtual accident image showing a virtual accident between the vehicle and the virtual accident object, and outputs the virtual accident image generated.

11 Claims, 4 Drawing Sheets

VIRTUAL-ACCIDENT-IMAGE GENERATION DEVICE, VIRTUAL-ACCIDENT-IMAGE GENERATION METHOD, AND RECORDING MEDIUM

CROSS REFERENCE TO RELATED APPLICATION

The present application is based on and claims priority of Japanese Patent Application No. 2023-054470 filed on Mar. 30, 2023.

FIELD

The present disclosure relates to a virtual-accident-image generation device, a virtual-accident-image generation method, and a recording medium.

BACKGROUND

As technology that prompts drivers to drive safely, the following techniques are known: a technique that indicates a driver while driving that driving of the driver corresponds to dangerous driving; a technique that provides a notification about a dangerous area on the road; and the like.

For example, Patent Literature (PTL) 1 discloses a driving assistance device including: a danger history generator that, every time a detector detects a danger avoidance behavior, generates danger history information that includes a position of a subject vehicle when the danger avoidance behavior was detected; and a warning provider that provides a warning for the driver to drive safely when the subject vehicle is moving from the position included in the danger history information toward another position that is included in the danger history information and is located within a predetermined range.

CITATION LIST

Patent Literature

PTL 1: Japanese Unexamined Patent Application Publication No. 2015-219736

SUMMARY

However, the driving assistance device according to PTL 1 can be improved upon.

In view of this, the present disclosure provides a virtual-accident-image generation device, a virtual-accident-image generation method, and a recording medium that are capable of improving upon the above related art.

A virtual-accident-image generation device according to an aspect of the present disclosure includes: a dangerous driving determiner capable of determining, based on vehicle information regarding a vehicle driven by a driver, that driving dangerous driving; a of the driver corresponds to virtual-accident-object generator that generates, based on the vehicle information and a determination result that was determined by the dangerous driving determiner and indicates that the driving of the driver corresponds to the dangerous driving, a virtual accident object that would potentially get into an accident with the vehicle if the virtual accident object were actually present, in an image of a scene where the driver is driving the vehicle; and a virtual-accident-image generator that generates, based on the virtual accident object generated by the virtual-accident-object generator, a virtual accident image showing a virtual accident between the vehicle and the virtual accident object, and outputs the virtual accident image generated.

The virtual-accident-image generation device and the like according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

The embodiment described below shows a generic or specific example of the present disclosure. The numerical values, shapes, materials, elements, structural the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements.

In addition, the diagrams are schematic representations, and thus are not necessarily true to scale. Also, in the diagrams, structural elements that are the same are given the same reference numerals.

Hereinafter, an embodiment will be described specifically with reference to the drawings.

Embodiment

<Configuration>

First, virtual-accident-image generation system 1 according to an embodiment that includes virtual-accident-image generation device 3 of the embodiment will be described with reference to FIGS. 1 to 2C.

Figure 1:
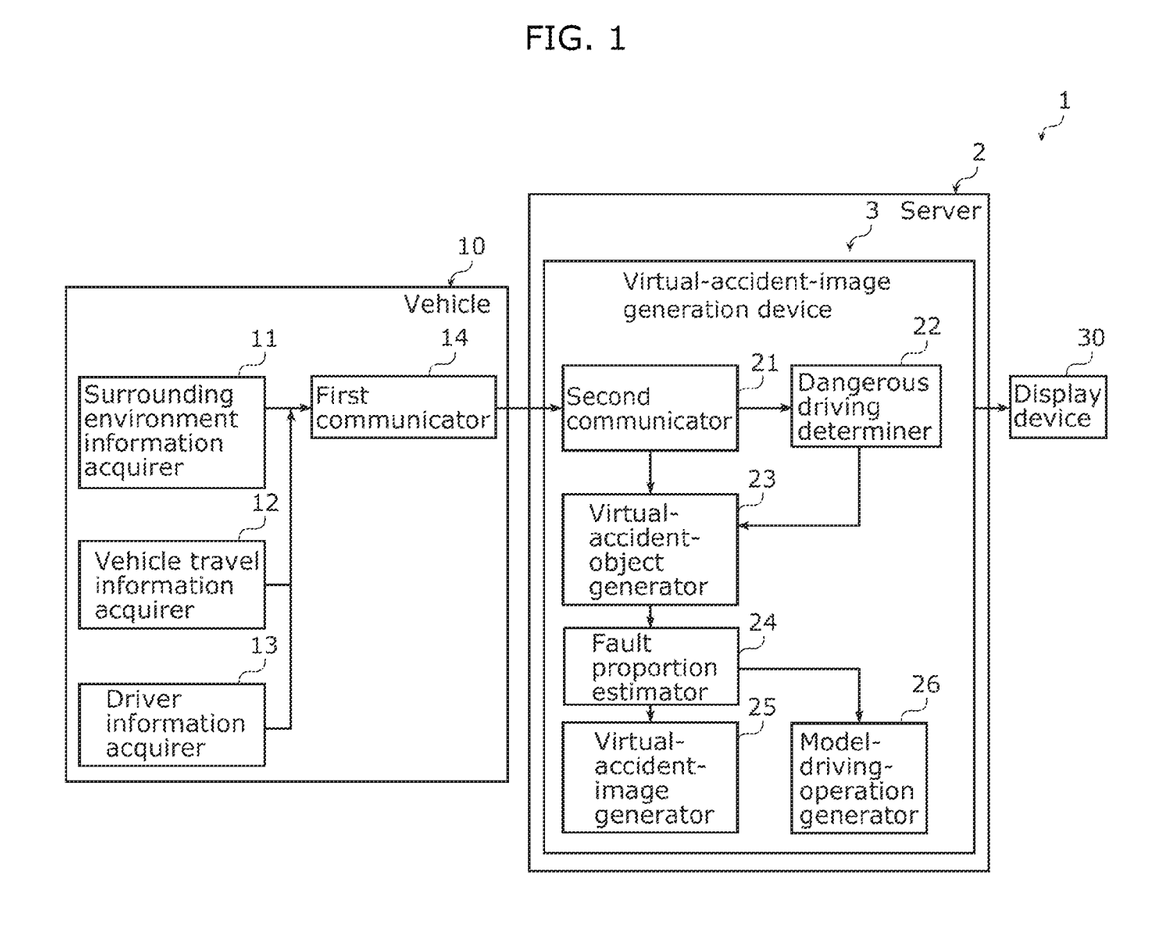
FIG. 1 is a block diagram showing a virtual-accident-image generation system according to an embodiment.
Figure 2A:
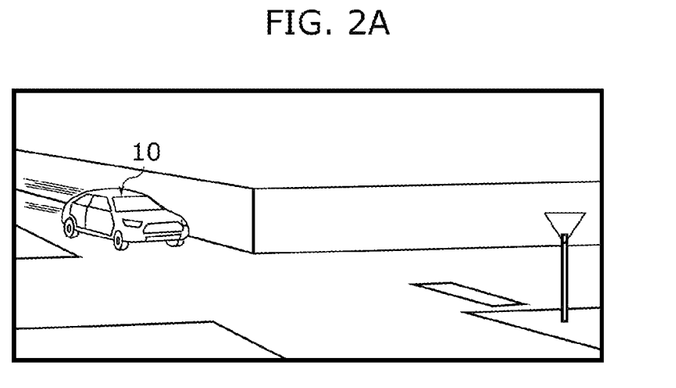
FIG. 2A is a diagram showing a situation determined as dangerous driving.
Figure 2B:
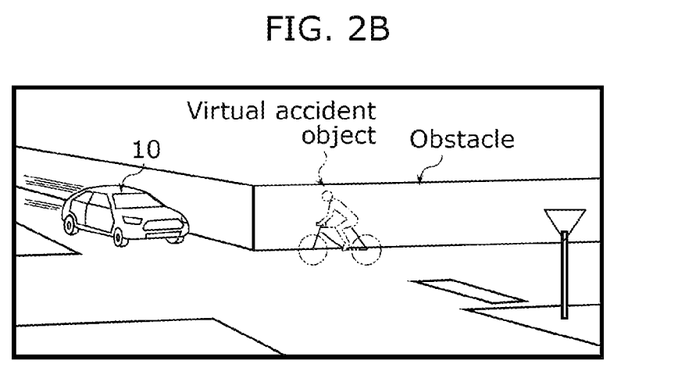
FIG. 2B is a diagram showing a virtual-accident-object image generated by adding a virtual accident object to the image determined as dangerous driving.

FIG. 1 is a block diagram showing virtual-accident-image generation system 1 according to the embodiment. FIG. 2A is a diagram showing a situation determined as dangerous driving. FIG. 2B is a diagram showing a virtual-accident-object image generated by adding a virtual accident object to the image determined as dangerous driving. FIG. 2C is a diagram showing a virtual accident image showing a virtual accident between the virtual accident object and vehicle 10.

As shown in FIG. 1, virtual-accident-image generation system 1 includes vehicle 10, server 2, and display device 30.

Vehicle 10 is a vehicle driven by a driver and is capable of acquiring vehicle information regarding vehicle 10 when the driver drives vehicle 10. Vehicle 10 is a running body equipped with wheels that can run on roads and streets such as a bicycle or a motor cycle. In the present embodiment, vehicle 10 is an automobile. The vehicle information regarding vehicle 10 includes information indicating a surrounding environment of running vehicle 10 (hereinafter, the information will be referred to as "surrounding environment information"), information indicating the running state of vehicle 10 (hereinafter, the information will be referred to as "vehicle travel information"), and information regarding the driver who is driving vehicle 10 (hereinafter, the information will be referred to as "driver information").

Specifically, vehicle 10 includes surrounding environment information acquirer 11, vehicle travel information acquirer 12, driver information acquirer 13, and first communicator 14.

Surrounding environment information acquirer 11 acquires surrounding environment information. For example, surrounding environment information acquirer 11 acquires surrounding environment information when vehicle 10 is driven by the driver and running, and acquires surrounding environment information when vehicle 10 is stationary.

The surrounding environment information includes surrounding area map information regarding the surroundings of vehicle 10 and object information regarding objects in the surroundings of vehicle 10. Specifically, the surrounding area map information includes information on the shape of roads in the surroundings of vehicle 10, and the size, the shape, the position, and the number of intersections in the surroundings of vehicle 10, as well as the position and the number of traffic lights in the surroundings of vehicle 10, the blind spots invisible from the driver who is driving vehicle 10, and the like. Also, the object information regarding objects in the surroundings of vehicle 10 includes information on the position and the number of other vehicles in the surroundings of vehicle 10, the position and the number of people in the surroundings of vehicle 10, and the like.

Surrounding environment information acquirer 11 is an image capturer such as a drive recorder that can record images and sounds of objects in the surroundings of vehicle 10, a sensor such as a light detection and ranging (LiDAR) sensor that is capable of detecting the position of an object in the surroundings of vehicle 10, the distance to the object, and the number of objects in the surroundings of vehicle 10, or the like. Also, surrounding environment information acquirer 11 may include a map information acquirer that acquires surrounding area map information regarding the surrounding area of running vehicle 10 driven by the driver.

Surrounding environment information acquirer 11 outputs the acquired surrounding area map information to first communicator 14. First communicator 14 can thereby transmit the surrounding area map information to server 2.

Vehicle travel information acquirer 12 acquires vehicle travel information. For example, vehicle travel information acquirer 12 acquires information regarding running vehicle 10, and acquires information indicating the position of vehicle 10. Specifically, the information regarding running vehicle 10 includes a history of the travel speed of vehicle 10, a driver's steering wheel operation history, and the like. Also, the information indicating the position of vehicle 10 includes a history such as global positioning system (GPS) information based on which vehicle 10 travelled.

Vehicle travel information acquirer 12 is a vehicle speed sensor that is capable of detecting the travel speed of vehicle 10, a steering angle sensor that is capable of detecting a steering wheel operation, a communicator that is capable of acquiring the GPS information, or the like.

Vehicle travel information acquirer 12 outputs the acquired vehicle travel information to first communicator 14. First communicator 14 can thereby transmit the vehicle travel information to server 2.

Driver information acquirer 13 acquires driver information. The driver information includes information on driver's line of sight, and the like.

Driver information acquirer 13 is a line-of-sight detection sensor that is capable of detecting the line of sight of the driver who is driving vehicle 10 or the like.

Driver information acquirer 13 outputs the acquired driver information to first communicator 14. First communicator 14 can thereby transmit the driver information to server 2.

First communicator 14 is a wireless communication module that is included in vehicle 10 and is capable of performing wireless communication with server 2. As described above, first communicator 14 transmits the surrounding environment information, the vehicle travel information, and the driver information to server 2.

Server 2 is an information processing device provided outside vehicle 10. Server 2 includes virtual-accident-image generation device 3. FIG. 1 shows an example in which virtual-accident-image generation device 3 is included in server 2, but the configuration is not limited thereto. For example, virtual-accident-image generation device 3 may be included in vehicle 10.

Virtual-accident-image generation device 3 can present, to the driver, an image for the driver to recognize that the driving of the driver corresponds to dangerous driving when the driver is driving dangerously. The image presented to the driver may be a moving image or a still image. The image for the driver to recognize that the driving of the driver corresponds to dangerous driving may be an actually captured image of the driver driving dangerously, a virtual image of the driver driving dangerously, or the like.

Specifically, virtual-accident-image generation device 3 includes second communicator 21, dangerous driving determiner 22, virtual-accident-object generator 23, fault proportion estimator 24, virtual-accident-image generator 25, and exemplary-driving-operation generator 26.

Second communicator 21 is a wireless communication module capable of performing wireless communication with vehicle 10. Second communicator 21 receives the surrounding environment information, the vehicle travel information, and the driver information transmitted from vehicle 10. Second communicator 21 outputs the surrounding environment information, the vehicle travel information, and the driver information that have been received to dangerous driving determiner 22 and virtual-accident-object generator 23.

Dangerous driving determiner 22 is capable of determining that the driving of the driver corresponds to dangerous driving based on the information regarding vehicle 10 driven by the driver. As used herein, the term "dangerous driving" refers to driving that would highly potentially cause an accident although no accident has actually occurred. For example, the dangerous driving encompasses the following: driving without the driver performing sufficient safety confirmation; distracted driving; high-speed driving in an area where there is one or more people around the vehicle;

sudden lane change; rapid acceleration; sudden steering; lane deviation; a delay in brake timing; excessive speeding; driving that corresponds to a violation of laws and regulations; and the like.

Specifically, dangerous driving determiner 22 determines, based on the surrounding environment information, the vehicle travel information, and the driver information that have been acquired from vehicle 10, whether the driving of the driver who is driving vehicle 10 corresponds to dangerous driving. For example, in the case of a scene where the driver information indicates that the driving of the driver corresponds to distracted driving such as the driver's line of sight being directed toward the inside of the vehicle cabin when the surrounding environment information indicates that there is one or more people around the vehicle, dangerous driving determiner 22 determines that the driving of the driver corresponds to dangerous driving. In another example, in the case of a scene where the driver information indicates that the driver is driving vehicle 10 without performing sufficient safety confirmation (for example, the driver does not decelerate, the driver is performing distracted driving, or the like) when the surrounding environment information indicates that there are many blind spots in the surrounding environment of the vehicle, dangerous driving determiner 22 determines that the driving of the driver corresponds to dangerous driving. As described above, dangerous driving determiner 22 can determine whether the driving of the driver corresponds to dangerous driving according to the scene.

Dangerous driving determiner 22 may determine that the driving of the driver corresponds to dangerous driving when the driver drives vehicle 10 despite the fact that the surrounding environment information indicates that there is one or more people or one or more other vehicles near vehicle 10. For example, dangerous driving determiner 22 also determines that the driving of the driver corresponds to dangerous driving when the surrounding environment information indicates that there is one or more people or one or more other vehicles near vehicle 10, and an accident was avoided as a result of the one or more people or the one or more other vehicles avoiding a collision with vehicle 10 driven by the driver. Also, dangerous driving determiner 22 may also determine that the driving of the driver corresponds to dangerous driving when the travel speed indicated by the vehicle travel information exceeds a predetermined speed level. Also, dangerous driving determiner 22 may also determine that the driving of the driver corresponds to dangerous driving even when the driver information simply indicates that the driving of the driver corresponds to distracted driving such as the driver's line of sight being directed toward the inside of the vehicle cabin.

Dangerous driving determiner 22 outputs a determination result indicating that the driving of the driver corresponds to dangerous driving to virtual-accident-object generator 23.

Virtual accident object generator 23 acquires the determination result indicating that the driving of the driver corresponds to dangerous driving from dangerous driving determiner 22, and acquires the surrounding environment information, the vehicle travel information, and the driver information from second communicator 21. Based on the surrounding environment information, the vehicle travel information, the driver information, and the determination result that was determined by dangerous driving determiner 22 and indicates that the driving of the driver corresponds to dangerous driving, virtual-accident-object generator 23 generates a virtual accident object as shown in FIG. 2B that would potentially get into an accident with vehicle 10 if the virtual accident object were actually present and that conforms to the image (scene image) showing the driver who is driving vehicle 10 shown in FIG. 2A, and outputs the generated virtual accident object.

Specifically, virtual-accident-object generator 23 generates a virtual accident object according to the scene based on which it has been determined that the driving of the driver corresponds to dangerous driving. For example, virtual-accident-object generator 23 generates a virtual accident object when the surrounding environment information indicates that there is one or more people or one or more other vehicles near vehicle 10, and the one or more people or the one or more other vehicles have changed their behavior. In another example, virtual-accident-object generator 23 generates a virtual accident object when the surrounding environment information indicates that one or more people or one or more other vehicles near vehicle 10 take no action to avoid a collision with vehicle 10 driven by the driver. In a yet another example, virtual-accident-object generator 23 generates a virtual accident object that is approaching vehicle 10 in the case of the scene where the driver is performing distracted driving. In a yet another example, virtual-accident-object generator 23 generates a virtual accident object that jumps out from a blind spot and is approaching vehicle 10 in the case of the scene where the driver is driving vehicle 10 without performing sufficient safety confirmation.

As described above, virtual-accident-object generator 23 generates a virtual accident object based on a factor based on which the driving of the driver is determined as dangerous driving, or generates a virtual accident object in a spot for which the driver does not perform safety confirmation. In the present embodiment, virtual-accident-object generator 23 generates a virtual accident object that would potentially get into an accident if the virtual accident object were actually present although no accident has actually occurred.

As used herein, the term "virtual accident object" refers to an object that would potentially get into an accident with vehicle 10 if it were actually present. More specifically, the term "virtual accident object" refers to an object virtually reproduced in a scene determined as dangerous to show that there is a possibility of an accident if it were actually present although no accident has actually occurred. For example, the virtual accident object encompasses: a virtually reproduced accident object showing another vehicle or a person recognized by the driver approaching to contact with vehicle 10; a virtually reproduced accident object showing a person approaching to contact with vehicle 10 from a blind spot invisible from the driver who is driving vehicle 10 due to the presence of an obstacle, assuming that vehicle 10 and the person are both hidden behind the obstacle as shown in FIG. 2B; and the like.

Then, virtual-accident-object generator 23 outputs the virtual accident object generated according to the scene determined as dangerous driving to fault proportion estimator 24.

Fault proportion estimator 24 estimates a fault proportion in case of a virtual accident between vehicle 10 and the virtual accident object generated by virtual-accident-object generator 23.

For example, fault proportion estimator 24 may determine the fault proportion by comparing the virtual accident with a data table showing the relationship between pre-set accident details and pre-set fault proportions. Specifically, fault proportion estimator 24 estimates the fault proportion in the virtual accident using the data table showing the relationship between pre-set accident details and pre-set fault proportions. For example, the data table may be stored in a storage included in server 2.

The data table may be set as follows, for example.

(1) In the case of an accident in which, at an intersection with traffic lights, when a first vehicle is running on a road, and a second vehicle is running on another road, the second vehicle proceeds into the intersection despite the fact that the traffic light on the other road is red, and collides with the first vehicle that is already in the intersection because the traffic light on the road is green, the fault proportion of the second vehicle may be set to 100%.

(2) In the case of an accident in which, at an intersection without traffic lights, when a first vehicle is running on a road, and a second vehicle is running on another road at the same speed as the first vehicle, both of the first vehicle and the second vehicle proceed into the intersection and collide with each other, the fault proportion of the first vehicle may be set to 40%, and the fault proportion of the second vehicle may be set to 60% because, due to the left-priority rule, priority is given to the first vehicle over the second vehicle when the first vehicle proceeds into the intersection from the left side.

(3) In the case of an accident in which, at an intersection without traffic lights, when a first vehicle is running on a road, and a second vehicle is running on another road that is a one-way road, the first vehicle that has proceeded into the intersection collides with the second vehicle that violated the one-way traffic rule and also proceeded into the intersection, the fault proportion of the first vehicle may be set to 20%, and the fault proportion of the second vehicle may be set to 80%.

(4) In the case of an accident in which, at an intersection without traffic lights, when a first vehicle is running on a road that is a broad road, and a second vehicle is running on another road that is a narrow road, both of the first vehicle and the second vehicle proceed into the intersection and collide with each other, the fault proportion of the first vehicle may be set to 30%, and the fault proportion of the second vehicle may be set to 70%.

(5) In the case of an accident in which, at an intersection without traffic lights, a second vehicle running on a road with a stop sign proceeds into the intersection and collides with a first vehicle running on another road without a stop sign, the fault proportion of the second vehicle may be set to 80%, and the fault proportion of the first vehicle may be set to 20%.

(6) In the case of an accident in which, at an intersection without traffic lights, when a first vehicle is running on a road that is a priority road, and a second vehicle is running on another road that is a non-priority road, both of the first vehicle and the second vehicle proceed into the intersection and collide with each other, the fault proportion of the first vehicle may be set to 10%, and the fault proportion of the second vehicle may be set to 90%.

As described above, in the data table, the fault proportion may be set as appropriate according to the accident details.

For example, fault proportion estimator 24 may estimate the fault proportion based on a similarity between the virtual accident and an accident that actually occurred in the past. At this time, fault proportion estimator 24 uses a plurality of history data indicating the relationship between the accident details of accidents that actually occurred in the past and the fault proportions in the accidents. Specifically, fault proportion estimator 24 may estimate, as the fault proportion, a value obtained by adjusting the fault proportion shown in extracted history data based on the similarity between the virtual accident and an accident that actually occurred in the past. Also, fault proportion estimator 24 may extract history data that is most similar to the virtual accident, and estimate the fault proportion shown in the extracted history data as the fault proportion in the virtual accident.

Fault proportion estimator 24 outputs the estimated fault proportion to virtual-accident-image generator 25. Also, fault proportion estimator 24 may output the estimated fault proportion to display device 30. Display device 30 can thereby display the estimated fault proportion. For example, display device 30 may display the estimated fault proportion in the following manner such as "the fault proportion of the vehicle is ○ %" or "the fault proportion of the virtual accident object is ○ %".

Virtual-accident-image generator 25 acquires the virtual accident object from virtual-accident-object generator 23 via fault proportion estimator 24. Virtual-accident-image generator 25 generates, based on at least the virtual accident object generated by virtual-accident-object generator 23, a virtual accident image showing a virtual accident between vehicle 10 and the virtual accident object, and outputs the generated virtual accident image. Also, virtual-accident-image generator 25 may also generate a virtual-accident-image based on the vehicle information and the virtual accident object, and output the generated virtual accident image.

Figure 2C:
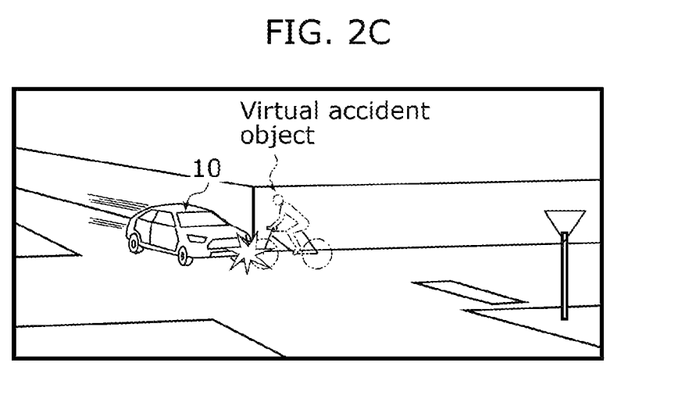
FIG. 2C is a diagram showing a virtual accident image showing a virtual accident between the virtual accident object and the vehicle.

Specifically, as shown in FIG. 2C, virtual-accident-image generator 25 generates a virtual accident image in case of a virtual accident between the virtual accident object and vehicle 10.

For example, virtual-accident-image generator 25 may use a scene image determined as dangerous driving based on the surrounding environment information, the vehicle travel information, and the driver information. The scene image may be a virtually reproduced image that perfectly imitates the surrounding environment, or a moving image acquired by surrounding environment information acquirer 11, the moving image showing the surrounding environment in which the vehicle actually travelled indicated by the surrounding environment information. Specifically, when the driver is performing dangerous driving such as distracted driving, virtual-accident-image generator 25 may generate a scene image showing that the driver is performing distracted driving. In a yet another example, when vehicle 10 is running in a local area where there are many blind spots, virtual-accident-image generator 25 may generate a scene image, as shown in FIG. 2B, showing that the driver is driving vehicle 10 without performing sufficient safety confirmation. Virtual-accident-image generator 25 may generate an image as shown in FIG. 2C showing a virtual accident between the virtual accident object and vehicle 10 as the virtual-accident-image by adding the virtual accident object to any of these scene images.

The field of view shown by the virtual-accident-image may be, for example, a bird's-eye view, an image as viewed from a person in the surroundings of vehicle 10, an image as viewed from another driver driving another vehicle, an image as viewed from the driver in the vehicle, or the like.

Also, virtual-accident-image generator 25 may further generate an image showing a behavior of the driver upon performing the dangerous driving by using the vehicle information regarding vehicle 10, and output the generated image. In this case, virtual-accident-image generator 25 may generate a virtual-accident-image by adding a virtual image obtained by clipping the driver's field of view when it is determined that the driver is performing dangerous driving. Also, virtual-accident-image generator 25 may cause display device 30 to display the virtual image generated by clipping the driver's field of view together with a bird's-eye view. By doing so, it is likely to cause the driver to recognize that the driver was performing dangerous driving.

Also, virtual-accident-image generator 25 generates and outputs the virtual accident image when the fault proportion estimated by fault proportion estimator 24 is higher than a predetermined value. Also, virtual-accident-image generator 25 may not generate the virtual-accident-image when the fault proportion estimated by fault proportion estimator 24 is less than or equal to the predetermined value. Whether the fault proportion estimated by fault proportion estimator 24 is higher than the predetermined value may be determined by virtual-accident-image generator 25 and exemplary-driving-operation generator 26, or may be determined by fault proportion estimator 24. The predetermined value is a pre-set value, and can be set to any value.

Virtual-accident-image generator 25 outputs the generated virtual accident image to display device 30.

Exemplary-driving-operation generator 26 acquires the virtual accident object from virtual-accident-object generator 23 via fault proportion estimator 24. When the fault proportion estimated by fault proportion estimator 24 is higher than the predetermined value, exemplary-driving-operation generator 26 generates an exemplary driving image showing an exemplary driving operation for the driver based on at least the virtual accident object, and outputs the generated exemplary driving image. Also, exemplary-driving-operation generator 26 may generate the exemplary driving image based on the vehicle information and the virtual accident object, and output the generated exemplary driving image.

Specifically, exemplary-driving-operation generator 26 generates an exemplary driving image showing an exemplary driving operation for the driver and outputs the generated exemplary driving image to display device 30 so as to present, to the driver whose driving was determined as corresponding to dangerous driving, information on how the driver should drive the vehicle. For example, exemplary-driving-operation generator 26 generates an exemplary driving image that prompts the driver to change the driving operations including a steering wheel operation, an acceleration operation, and a braking operation to exemplary driving operations, and outputs the generated exemplary driving image to display device 30. In a yet another example, when driving such as driving without the driver performing sufficient safety confirmation, distracted driving, high-speed driving in an area where there is one or more people around the vehicle, sudden lane change, lane deviation, or excessive speeding is detected, exemplary-driving-operation generator 26 generates an exemplary driving image for informing the driver of these problems, and outputs the generated exemplary driving image to display device 30. In a yet another example, when the driver performs a wrong steering wheel operation, exemplary-driving-operation generator 26 generates an exemplary driving image that prompts the driver to correct the steering angle to perform the correct steering wheel operation, and outputs the generated exemplary driving image to display device 30. In a yet another example, when the brake timing of driver the is delayed, exemplary-driving-operation generator 26 generates an exemplary driving image that prompts the driver to brake the vehicle at an appropriate brake timing, and outputs the generated exemplary driving image to display device 30. For example, when the brake timing of the driver is delayed while the driver is actually driving vehicle 10, exemplary-driving-operation generator 26 may display, on the screen of display device 30, a message or an icon that prompts the driver to brake the vehicle. Displaying the message or the icon on the screen of display device 30 is not limited to when the brake timing of the driver is delayed, and it is sufficient that the message or the icon is displayed on the screen of display device 30 when the driver performs dangerous driving.

Also, virtual-accident-image generation device 3 may record an image of the driver obtained when the driver was performing dangerous driving and an image of the driver obtained after the driver changed the driving operations to exemplary driving operations after looking at the exemplary driving image. In this case, virtual-accident-image generation device 3 may display the image of the driver obtained when the driver was performing dangerous driving and the image of the driver obtained after the driver changed the driving operations to exemplary driving operations side by side on display device 30. The driver can thereby understand that the driving operations of the driver have been improved.

Also, virtual-accident-image generation device 3 may record, in advance, images of skilled drivers driving vehicles. In this case, images of a plurality of skilled drivers driving vehicles may be stored in a storage so as to cope with various scenes. Exemplary-driving-operation generator 26 may display, on display device 30, an exemplary driving image using a scene image (an image showing a skilled driver driving a vehicle) that is similar to the scene where the driver was performing dangerous driving. Also, exemplary-driving-operation generator 26 may virtually train the driver to perform appropriate driving operations by virtually reproducing a scene where the driver is performing dangerous driving as an exemplary driving image, and embedding an image of the driver into the virtual scene.

Also, depending on the case, exemplary-driving-operation generator 26 may forcibly brake vehicle 10 by outputting a control signal for controlling vehicle 10 to an electronic control unit (ECU) or the like provided in vehicle 10, or may notify the driver of the fact that the driver is performing dangerous driving by vibrating the driver's seat. Also, when the driver drives vehicle 10 at an excessive speed, exemplary-driving-operation generator 26 may forcibly release the pressed accelerator pedal by outputting a control signal for controlling vehicle 10 to the ECU or the like provided in vehicle 10.

Display device 30 can display the virtual accident object, the fault proportion, the virtual accident image, and the exemplary driving image. These images displayed by display device 30 may be a bird's-eye view, an image as viewed from a person in the surroundings of vehicle 10, an image as viewed from another driver driving another vehicle, an image as viewed from the driver in the vehicle, or the like. All of these images displayed by display device 30 may be, for example, images generated by computer graphics or images obtained by adding the virtual accident object to an image (scene image) of the driver who is driving vehicle 10.

Display device 30 may be, for example, an electronic mirror, a head-up display (HUD), a car navigation system, a smartphone, drive simulator, or the like. Display device 30 may be included in vehicle 10, or installed in a facility.

<Processing Operation>

Next, processing operations performed by virtual-accident-image generation device 3 of the present embodiment will be described.

First, processing operations performed by vehicle 10 will be described with reference to FIG. 3.

Figure 3:
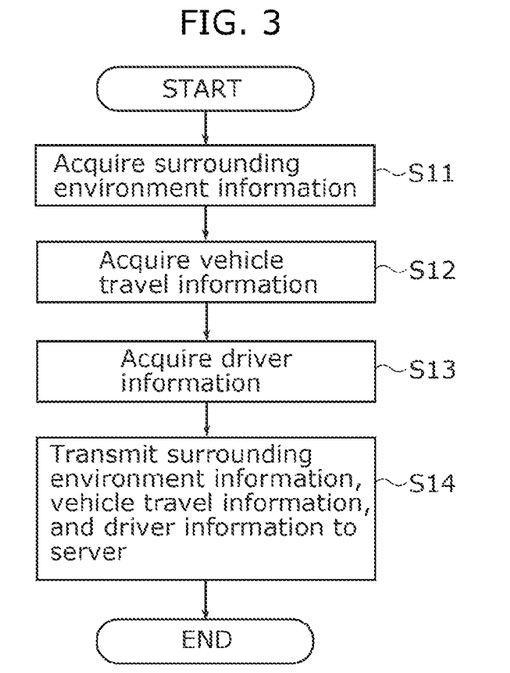
FIG. 3 is a flowchart illustrating processing operations performed by the vehicle included in the virtual-accident-image generation system according to the embodiment.

FIG. 3 is a flowchart illustrating processing operations performed by vehicle 10 included in virtual-accident-image generation system 1 according to the embodiment.

First, as shown in FIG. 3, surrounding environment information acquirer 11 acquires surrounding environment information (S11). Surrounding environment information acquirer 11 outputs the acquired surrounding area map information to first communicator 14.

Next, vehicle travel information acquirer 12 acquires vehicle travel information (S12). Vehicle travel information acquirer 12 outputs the acquired vehicle travel information to first communicator 14.

Next, driver information acquirer 13 acquires driver information (S13). Driver information acquirer 13 outputs the acquired driver information to first communicator 14.

The order in which the processing operations in steps S11 to S13 are performed may be changed, or the processing operations in steps S11 to S13 may be performed in parallel.

First communicator 14 transmits the surrounding environment information, the vehicle travel information, and the driver information to server 2 (S14). First communicator 14 may transmit each of the surrounding environment information, the vehicle travel information, and the driver information to server 2 every time the information is acquired, or may transmit the surrounding environment information, the vehicle travel information, and the driver information together to server 2.

Then, the processing operations performed by vehicle 10 shown in FIG. 3 end.

Next, processing operations performed by virtual-accident-image generation device 3 included in server 2 will be described with reference to FIG. 4.

Figure 4:
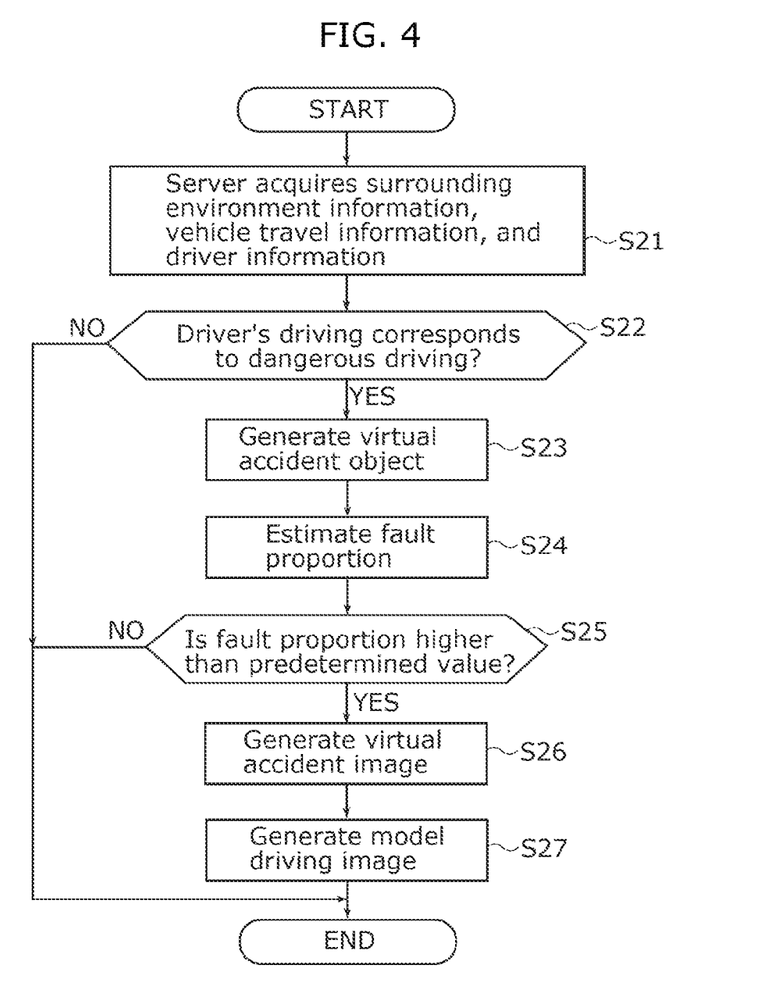
FIG. 4 is a flowchart illustrating processing operations performed by the virtual-accident-image generation device included in the virtual-accident-image generation system according to the embodiment.

FIG. 4 is a flowchart illustrating processing operations performed by virtual-accident-image generation device 3 included in virtual-accident-image generation system 1 of the present embodiment.

First, as shown in FIG. 4, second communicator 21 receives surrounding environment information, vehicle travel information, and driver information from vehicle 10, and server 2 thereby acquires the surrounding environment information, the vehicle travel information, and the driver information (S21). Second communicator 21 outputs the surrounding environment information, the vehicle travel information, and the driver information to dangerous driving determiner 22 and virtual-accident-object generator 23.

Next, dangerous driving determiner 22 determines, based on the surrounding environment information, the vehicle travel information, and the driver information acquired from second communicator 21, whether the driving of the driver who is driving vehicle 10 corresponds to dangerous driving (S22). If it is determined by dangerous driving determiner 22 that the driving of the driver who is driving vehicle 10 does not correspond to dangerous driving (NO in S22), the flowchart shown in FIG. 4 ends.

On the other hand, if it is determined by dangerous driving determiner 22 that the driving of the driver who is driving vehicle 10 corresponds to dangerous driving (YES in S22), dangerous driving determiner 22 outputs a determination result indicating that the driving of the driver corresponds to dangerous driving to virtual-accident-object generator 23.

Next, virtual-accident-object generator 23 acquires the determination result indicating that the driving of the driver corresponds to dangerous driving from dangerous driving determiner 22, and acquires the surrounding environment information, the vehicle travel information, and the driver information from second communicator 21. Virtual accident object generator 23 generates, based on the vehicle information regarding vehicle 10 and the determination result that was determined by dangerous driving determiner 22 and indicates that the driving of the driver corresponds to dangerous driving, a virtual accident object that conforms to an image of the driver dangerously driving vehicle 10, and outputs the generated virtual accident object to fault proportion estimator 24 (S23).

Next, fault proportion estimator 24 acquires the virtual accident object from virtual-accident-object generator 23. Fault proportion estimator 24 estimates a fault proportion in case of a virtual accident between vehicle 10 and the virtual accident object generated by virtual-accident-object generator 23 (S24).

Next, fault proportion estimator 24 determines whether the estimated fault proportion is higher than a predetermined value (S25). If it is determined by fault proportion estimator 24 that the estimated fault proportion is less than or equal to the predetermined value (NO in S25), the flowchart shown in FIG. 4 ends.

On the other hand, if it is determined by fault proportion estimator 24 that the estimated fault proportion is higher than the predetermined value (YES in S25), fault proportion estimator 24 outputs the virtual accident object to virtual-accident-image generator 25 and exemplary-driving-operation generator 26.

Next, if it is determined that the fault proportion estimated by fault proportion estimator 24 is higher than the predetermined value, virtual-accident-image generator 25 generates a virtual accident image based on at least the virtual accident object, and outputs the generated virtual accident image to display device 30 (S26). Display device 30 displays a virtual accident image as shown in FIG. 2C. At this time, virtual-accident-image generator 25 may cause display device 30 to display the fault proportion estimated by fault proportion estimator 24.

Next, if it is determined that the fault proportion estimated by fault proportion estimator 24 is higher than the predetermined value, exemplary-driving-operation generator 26 generates an exemplary driving image showing an exemplary driving operation for the driver based on at least the virtual accident object, and outputs the generated exemplary driving image to display device 30 (S27). Display device 30 displays the exemplary driving image.

Then, the processing operations performed by server 2 shown in FIG. 4 end. The processing operations shown in FIGS. 3 and 4 are repeatedly performed.

<Operational Advantage>

A description will be given of operational advantages of virtual-accident-image generation device 3 according to the present embodiment described above, a virtual-accident-image generation method, and a program.

The conventional technology described above has the following problem. Even when a driver is performing dangerous driving, the driver cannot recognize the fact that the driver is performing dangerous driving if an accident does not occur as a result of another vehicle or a pedestrian taking an action to avoid a danger or being not present. In this case, even when a warning about the dangerous driving is issued to the driver, the driver cannot accept the fact, and it is therefore not possible to enhance the driver's consciousness on safety driving to improve the driving operations of the driver.

To address this, as described above, virtual-accident-image generation device 3 of the present embodiment includes: dangerous driving determiner 22 capable of determining, based on vehicle information regarding vehicle 10 driven by a driver, that driving of the driver corresponds to dangerous driving; virtual-accident-object generator 23 that generates, based on the vehicle information regarding vehicle 10 and a determination result that was determined by driving determiner 22 and indicates that the driving of the driver corresponds to dangerous driving determined by dangerous, a virtual accident object that would potentially get into an accident with vehicle 10 if the virtual accident object were actually present, in an image of a scene where the driver is driving vehicle 10; and virtual-accident-image generator 25 that generates, based on the virtual accident object generated by virtual-accident-object generator 23, a virtual accident image showing a virtual accident between vehicle 10 and the virtual accident object, and outputs the generated virtual accident image.

With this configuration, it is possible to determine that the driving of the driver corresponds to dangerous driving. Accordingly, with the virtual accident object, it is possible to inform the driver of the fact that the driving of the driver was dangerous.

Also, a virtual accident image showing a virtual accident between the virtual accident object and vehicle 10 can be generated, and thus the driver can look back at what was wrong with the driving of the driver determined as corresponding to dangerous driving, and also can recognize what kind of accident would be caused by the driving determined as corresponding to dangerous driving. For example, by presenting, to the driver, a virtual accident object indicating another vehicle that does not avoid a collision with vehicle 10 or a person that jumps out from a blind spot while the driver is performing dangerous driving, it is possible to cause the driver to recognize what kind of accident would be caused by the driving of the driver. Accordingly, it is possible to cause the driver to understand the driving that was actually conducted by the driver and determined as corresponding to dangerous driving, and thus even if an accident does not actually occur, the driver can easily recognize that the driving of the driver was dangerous driving.

Accordingly, with virtual-accident-image generation device 3, it is possible to help increase the driver's consciousness on safety driving. For this reason, it can be expected that the driver can reflect on the driving of the driver as dangerous driving, increase the consciousness on safety driving, and keep safe driving in mind. As a result, the consciousness on safety driving increases in the society, and it is therefore possible to suppress an increase in expenses caused by a loss of human lives, a loss of properties, a sharp increase of insurance fees and a loss of properties.

Also, a virtual-accident-image generation method according to the present embodiment includes: determining, based on vehicle information regarding vehicle 10 driven by a driver, that driving of the driver corresponds to dangerous driving; generating, based on the vehicle information regarding vehicle 10 and a determination result indicating that the driving of the driver corresponds to dangerous driving, a virtual accident object that would potentially get into an accident with vehicle 10 if the virtual accident object were actually present, in an image of a scene where the driver is driving vehicle 10; and generating, based on the virtual accident object generated, a virtual accident image showing a virtual accident between vehicle 10 and the virtual accident object, and outputting the virtual accident image generated.

With this method as well, the same operational advantages as described above can be obtained.

Also, a program according to the present embodiment is a program for a computer to execute the virtual-accident-image generation method.

With this program as well, the same operational advantages as described above can be obtained.

Also, in virtual-accident-image generation device 3 of the present embodiment, the vehicle information regarding vehicle 10 includes information indicating a surrounding environment of vehicle 10, information indicating a running state of vehicle 10, and information regarding the driver who is driving vehicle 10.

With this configuration, a realistic virtual accident image can be generated, and it is therefore possible to further help increase the driver's consciousness on safety driving.

Also, virtual-accident-image generation device 3 of the present embodiment further includes fault proportion estimator 24 that estimates a fault proportion in case of a virtual accident between vehicle 10 and the virtual accident object generated by virtual-accident-object generator 23.

With this configuration, the fault proportion in case of the virtual accident can be estimated, and it is therefore possible to cause the driver to recognize that the driving of the driver was dangerous and also recognize the fault proportion that may be caused by the driving. Accordingly, the driver can understand the magnitude of the fault proportion of the driver in case of an accident.

Also, because the fault proportion in case of a virtual accident is estimated, the following problem is unlikely to occur: even if there is no fault of the driver, the fault proportion is estimated, and a virtual accident image is thereby presented to the driver. It is therefore possible to suppress a situation in which the driver is less likely to trust the estimated fault proportion.

Also, in virtual-accident-image generation device 3 of the present embodiment, fault proportion estimator 24 estimates the fault proportion based on a similarity between the virtual accident and an accident that actually occurred.

With this configuration, the fault proportion in case of a virtual accident can be more accurately estimated.

Also, in virtual-accident-image generation device 3 of the present embodiment, fault proportion estimator 24 estimates the fault proportion based on the virtual accident and a pre-set accident fault proportion.

With this configuration, the fault proportion in case of a virtual accident can be easily estimated.

Also, in virtual-accident-image generation device 3 of the present embodiment, virtual-accident-image generator 25 further generates, by using the vehicle information regarding vehicle 10, an image showing a behavior of the driver upon performing the dangerous driving, and outputs the image generated.

With this configuration, the image showing the behavior of the driver upon performing the dangerous driving can be presented to the driver. Accordingly, the driver can recognize what was wrong with the driving of the driver determined as corresponding to dangerous driving. It is therefore possible to further help increase the driver's consciousness on safety driving.

Also, in virtual-accident-image generation device 3 of the present embodiment, when the fault proportion estimated by fault proportion estimator 24 is higher than a predetermined value, virtual-accident-image generator 25 generates the virtual accident image and outputs the virtual accident image generated.

For example, in the case where a virtual accident image in which the fault proportion of the driver is small is generated and presented to the driver, the driver is unlikely to recognize that there was a problem with the driving of the driver, and thus the driver is less likely to trust the virtual accident image.

However, according the present embodiment, the virtual accident image is generated when the fault proportion is higher than the predetermined value, and thus the driver can recognize what kind of accident would be caused by the driving of the driver determined as dangerous driving. It is therefore possible to further help increase the driver's consciousness on safety driving.

Also, virtual-accident-image generation device 3 of the present embodiment further includes exemplary-driving-operation generator 26 that, when dangerous driving determiner 22 determines that the driving of the driver corresponds to dangerous driving, generates an exemplary driving image showing an exemplary driving operation for the driver, and outputs the exemplary driving image generated.

With this configuration, by presenting the exemplary driving image to the driver, it is possible to cause the driver to change the dangerous driving. For this reason, it can be expected that the driver can increase the consciousness on safety driving and keep safe driving in mind.

Other Variations, Etc.

The present disclosure has been described above based on the embodiment. However, the present disclosure is not limited to the embodiment and the like given above.

For example, in the virtual-accident-image generation device and the like of the present embodiment, the dangerous driving determiner is included in the server. However, the dangerous driving determiner may be included in the vehicle. Furthermore, the virtual-accident-object generator may be included in the vehicle. Furthermore, the fault proportion estimator may be included in the vehicle. Furthermore, the virtual-accident-image generator may be included in the vehicle. Furthermore, the exemplary-driving-operation generator may be included in the vehicle. Thus, the virtual-accident-image generation device may be included in the vehicle. In this case, the fault proportion, the virtual accident image, the exemplary driving image, and the like can be displayed on the display device included in the vehicle, which eliminates the need to transmit them to the server. As a result, an increase in the load of communication between the vehicle and the server can be suppressed.

Also, in the virtual-accident-image generation device and the like of the present embodiment, the number of times dangerous driving was performed may be counted. In this case, if it is determined that the number of times dangerous driving was performed during a predetermined period is greater than or equal to a threshold value, the result may be reflected on the insurance fee of the driver. In other words, if it is determined that the number of times dangerous driving was performed is greater than or equal to a threshold value, the insurance fee of the driver may be increased.

Also, in the virtual-accident-image generation device and the like of the present embodiment, the virtual accident image may be reported to the National Police Agency, driving schools, and the like. In this case, the National Police Agency and driving schools can use the virtual accident image to promote safe driving.

Also, the virtual-accident-image generation device and the like of the present embodiment may include a storage for storing the virtual accident object, the fault proportion, the virtual accident image, and the exemplary driving image. In this case, the storage may store the virtual accident object, the fault proportion, the virtual accident image, and the exemplary driving image in association with the vehicle information. The storage may combine the virtual accident object, the fault proportion, the virtual accident image, and the exemplary driving image for the same scene into one.

Also, the structural elements included in the virtual-accident-image generation device and the like of the present embodiment are typically implemented as LSIs, which are integrated circuits. They may be individual single chips, or a part or all of these may be configured in a single chip.

Also, implementation of an integrated circuit is not limited to an LSI, and may be implemented by a dedicated circuit or a general-purpose processor. It is also possible to use a field programmable gate array (FPGA) that can be programmed after LSI production or a reconfigurable processor that enables reconfiguration of the connection and setting of circuit cells in the LSI.

In the embodiment given above, the structural elements may be configured using dedicated hardware, or may be implemented by executing a software program suitable for the structural elements. The structural elements may also be implemented by a program executor such as a CPU or a processor reading and executing a software program recorded in a recording medium such as a hard disk or a semiconductor memory.

Also, all of the numerical values used in the foregoing description are presented as examples to specifically describe the present disclosure, and thus the embodiment of the present disclosure is not limited to the numerical values presented above as examples.

Also, the functional blocks shown in the block diagram are presented as an example. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the order of steps performed in each of the flowcharts is merely an example to specifically describe the present disclosure. Accordingly, the steps in each of the flowcharts may be performed in an order other than those described above. Also, some of the steps may be performed simultaneously (in parallel) with the other steps.

The aspect of the present disclosure also encompasses other embodiments obtained by making various modifications that can be conceived by a person having ordinary skill in the art to the above embodiment as well as embodiments implemented by any combination of the structural elements and the functions of the above embodiment without departing from the scope of the aspect of the present disclosure.

The features of the virtual-accident-image generation device, the virtual-accident-image generation method, and the program described based on the embodiment above are given below.

<Technique 1>

A virtual-accident-image generation device including:
  a dangerous driving determiner capable of determining, based on vehicle information regarding a vehicle driven by a driver, that driving of the driver corresponds to dangerous driving;
  a virtual-accident-object generator that generates, based on the vehicle information and a determination result that was determined by the dangerous driving determiner and indicates that the driving of the driver corresponds to the dangerous driving, a virtual accident object that would potentially get into an accident with the vehicle if the virtual accident object were actually present, in an image of a scene where the driver is driving the vehicle; and a virtual-accident-image generator that generates, based the accident on virtual object generated the by virtual-accident-object generator, a virtual accident image showing a virtual accident between the vehicle and the virtual accident object, and outputs the virtual accident image generated.

<Technique 2>

The virtual-accident-image generation device according to technique 1,
wherein the vehicle information includes information indicating a surrounding environment of the vehicle, information indicating a running state of the vehicle, and information regarding the driver who is driving the vehicle.

<Technique 3>

The virtual-accident-image generation device according to technique 1 or 2 further including:
a fault proportion estimator that estimates a fault proportion in case of a virtual accident between the vehicle and the virtual accident object generated by the virtual-accident-object generator.

<Technique 4>

The virtual-accident-image generation device according to technique 3,
wherein the fault proportion estimator estimates the fault proportion based on a similarity between the virtual accident and an accident that actually occurred.

<Technique 5>

The virtual-accident-image generation device according to technique 3,
wherein the fault proportion estimator estimates the fault proportion based on the virtual accident and a pre-set accident fault proportion.

<Technique 6>

The virtual-accident-image generation device according to any one of techniques 1 to 5,
wherein the virtual-accident-image generator further generates, by using the vehicle information, an image showing a behavior of the driver upon performing the dangerous driving, and outputs the image generated.

<Technique 7>

The virtual-accident-image generation device according to any one of techniques 3 to 5,
wherein the virtual-accident-image generator generates and outputs the virtual accident image when the fault proportion estimated by the fault proportion estimator is higher than a predetermined value.

<Technique 8>

The virtual-accident-image generation device according to any one of techniques 1 to 7, further including:
an exemplary-driving-operation generator that, when the dangerous driving determiner determines that the driving of the driver corresponds to dangerous driving, generates an exemplary driving image showing an exemplary driving operation for the driver, and outputs the exemplary driving image generated.

<Technique 9>

A virtual-accident-image generation method including:
determining, based on vehicle information regarding a vehicle driven by a driver, that driving of the driver corresponds to dangerous driving;
generating, based on the vehicle information and a determination result indicating that the driving of the driver corresponds to dangerous driving, a virtual accident object that would potentially get into an accident with the vehicle if the virtual accident object were actually present, in an image of a scene where the driver is driving the vehicle; and
generating, based on the virtual accident object generated, a virtual accident image showing a virtual accident between the vehicle and the virtual accident object, and outputting the virtual accident image generated.

<Technique 10>

A non-transitory computer-readable recording medium having recorded thereon a program for causing a computer to execute the virtual-accident-image generation method according to technique 9.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-054470 filed on Mar. 30, 2023.

INDUSTRIAL APPLICABILITY

The present disclosure is applicable to, for example, a vehicle, a drive simulator, and the like.

The invention claimed is:

1. A virtual-accident-image generation device, comprising:
a dangerous driving determiner capable of determining, based on vehicle information regarding a vehicle driven by a driver, that driving of the driver corresponds to dangerous driving according to a scene where the vehicle is driven by the driver;
a virtual-accident-object generator that generates, based on the vehicle information and a determination result by the dangerous driving determiner which indicates that the driving of the driver corresponds to the dangerous driving, a virtual accident object to show a possibility of the vehicle being in an accident when a corresponding physical accident object is actually present in the scene where the vehicle is driven by the driver, the virtual accident object being added to an image of the scene where the driver is driving the vehicle, the virtual accident object not actually being present in the scene; and
a virtual-accident-image generator that generates, based on the virtual accident object generated by the virtual-accident-object generator, a virtual accident image showing a virtual accident between the vehicle and the virtual accident object in the scene, and outputs the virtual accident image.

2. The virtual-accident-image generation device according to claim 1,
wherein the vehicle information includes first information indicating a surrounding environment of the vehicle, second information indicating a running state of the vehicle, and third information regarding the driver who is driving the vehicle.

3. The virtual-accident-image generation device according to claim 1, further comprising:

a fault proportion estimator that estimates a fault proportion of the virtual accident between the vehicle and the virtual accident object generated by the virtual-accident-object generator.

4. The virtual-accident-image generation device according to claim 3,
wherein the fault proportion estimator estimates the fault proportion based on a similarity between the virtual accident and an accident that actually occurred.

5. The virtual-accident-image generation device according to claim 3,
wherein the fault proportion estimator estimates the fault proportion based on the virtual accident and a pre-set accident fault proportion.

6. The virtual-accident-image generation device according to claim 1,
wherein the virtual-accident-image generator further generates, by using the vehicle information, a second image showing a behavior of the driver upon performing the dangerous driving, and outputs the second image generated.

7. The virtual-accident-image generation device according to claim 3,
wherein the virtual-accident-image generator generates and outputs the virtual accident image when the fault proportion estimated by the fault proportion estimator is higher than a predetermined value.

8. The virtual-accident-image generation device according to claim 1, further comprising:
an exemplary-driving-operation generator that generates an exemplary driving image showing an exemplary driving operation for the driver, and outputs the exemplary driving image when the dangerous driving determiner determines that the driving of the driver corresponds to the dangerous driving.

9. A virtual-accident-image generation method, comprising:
determining, based on vehicle information regarding a vehicle driven by a driver, that driving of the driver corresponds to dangerous driving according to a scene where the vehicle is driven by the driver;
generating, based on the vehicle information and a determination result which indicates that the driving of the driver corresponds to the dangerous driving, a virtual accident object to show a possibility of the vehicle being in an accident when a corresponding physical accident object is actually present in the scene where the vehicle is driven by the driver, the virtual accident object being added to an image of the scene where the driver is driving the vehicle, the virtual accident object not actually being present in the scene; and
generating, based on the virtual accident object, a virtual accident image showing a virtual accident between the vehicle and the virtual accident object in the scene, and outputting the virtual accident image.

10. A non-transitory computer-readable recording medium including a program for causing a computer to execute the virtual-accident-image generation method according to claim 9.

11. A virtual-accident-image generation device, comprising:
a processor; and
a memory including a program that, when executed by the processor, causes the processor to perform operations, the operations including:
determining, based on vehicle information regarding a vehicle driven by a driver, that driving of the driver corresponds to dangerous driving according to a scene where the vehicle is driven by the driver;
generating, based on the vehicle information and a determination result which indicates that the driving of the driver corresponds to the dangerous driving, a virtual accident object to show a possibility of the vehicle being in an accident when a corresponding physical accident object is actually present in the scene where the vehicle is driven by the driver, the virtual accident object being added to an image of the scene where the driver is driving the vehicle, the virtual accident object not actually being present in the scene; and
generating, based on the virtual accident object, a virtual accident image showing a virtual accident between the vehicle and the virtual accident object in the scene, and outputting the virtual accident image.

* * * * *